United States Patent [19]

Toms et al.

[11] Patent Number: 5,021,803

[45] Date of Patent: Jun. 4, 1991

[54] INK JET PARALLEL CUSP PRODUCING SLOT OR EDGE CONFIGURED NOZZLE SYSTEM

[75] Inventors: Derek J. Toms, Cheshire; Ronald A. Coffee, Halsemere, both of England

[73] Assignee: Imperial Chemical Industries PLC, London, England

[21] Appl. No.: 412,603

[22] Filed: Sep. 27, 1989

Related U.S. Application Data

[63] Continuation of Ser. No. 219,880, Jul. 11, 1988, abandoned, which is a continuation of Ser. No. 819,908, Jan. 21, 1986, abandoned.

[30] Foreign Application Priority Data

Jan. 18, 1985 [GB] United Kingdom ................ 8501353

[51] Int. Cl.[5] ........................ G01D 15/18; H05B 3/00

[52] U.S. Cl. ...................................... 346/1.1; 346/75; 361/226; 361/228

[58] Field of Search ................................ 346/1.1, 75; 361/225-228

[56] References Cited

U.S. PATENT DOCUMENTS

| | | | |
|---|---|---|---|
| 3,060,429 | 10/1962 | Winston | 346/1.1 |
| 3,484,794 | 12/1969 | Winston | 346/75 |
| 3,656,171 | 4/1972 | Robertson | 346/1.1 |
| 4,326,204 | 4/1982 | Erin | 346/75 |
| 4,356,528 | 10/1982 | Coffee | 361/226 |
| 4,547,785 | 10/1985 | Jones | 346/1.1 |
| 4,549,243 | 10/1985 | Owen et al. | 361/228 |

*Primary Examiner*—Benjamin R. Fuller
*Assistant Examiner*—Gerald E. Preston
*Attorney, Agent, or Firm*—Cushman, Darby & Cushman

[57] ABSTRACT

A multi-jet print head for a continuous ink jet printer has its individual ink jets formed electrostatically instead of using a row of individual nozzles. Ink is supplied continuously through a slot in an electrically conducting body or to an elongated edge portion of such a body, while a strong electrostatic field is applied to draw off the ink as an array of parallel cusps. These break up at their tips to form a stream of ink drops which can then be deflected in known manner. The electrostatic field preferably has a reinforcing secondary field superimposed on it, which is cyclically varied at a suitable ink drop production frequency to synchronize formation of the ink drops at each of the cusp tips. This enables means for deflecting the drops to be synchronized with the moving drops for consistent deflections and corresponding optimum resolution. The use of a slot or edge portion reduces problems of nozzle clogging inherent in multi-nozzle arrays and the continuous ink flow provides uniform printing conditions along the length of the print head.

12 Claims, 1 Drawing Sheet

INK JET PARALLEL CUSP PRODUCING SLOT OR EDGE CONFIGURED NOZZLE SYSTEM

This is a continuation of application Ser. No. 07/219,880, filed July 11, 1988, now abandoned, which is a continuation of application Ser. No. 06/819,908, filed Jan. 21, 1986, now abandoned.

BACKGROUND OF THE INVENTION

The invention relates to ink jet printers having a plurality of continuous ink jets.

Apparatus has been developed over the past thirty years for direct printing onto receptor surfaces by emitting jets of ink drops from a print head under the control of information-carrying signals, to produce a record of the information (including both alpha numeric and graphical information) on the receptor surface. Such printers have developed mainly into two kinds, these being generally referred to as "continuous ink jet" and "drop on demand" printers respectively.

In continuous ink jet printers, the jets are emitted continuously, and selected ink drops are deflected from the stream of moving drops forming each jet, using a deflector responsive to the information-carrying signals. Printing can be effected by directing either the deflected or the undeflected drops towards the receptor surface, depending on the design of the particular printer being used. The remainder of the ink drops are generally caught, filtered and recycled. To enable the whole width of a page to be printed simultaneously, a multi-jet print head may be used having an array of such nozzles, each producing a continuous ink jet deflected independently of the others. The receptor surface can then be moved in a direction orthogonal to the array of nozzles in order to progress the printing along the receptor surface.

Deflection is usually effected by charging the drops and passing them through an electrostatic field, either the charge or the field being variable in response to the information-carrying signal. An early example of such a printer, using electrostatic deflection of a plurality of continuous jets is described by R G Sweet et al in U.S. Pat. No. 3,373,437. Other known forms of deflector include catcher tubes that are movable into or out from the flight path of the drops in response to information-carrying signals, but electrostatic deflectors are more usual.

To form a stream of drops, ink is conventionally forced under pressure through a fine nozzle, typically 25–80 μm in diameter. The ink appears generally to emerge as a continuous ligament of liquid, which breaks up into a stream of separate drops spontaneously after a short distance, depending on nozzle size and flow rate. Uniformity can be assisted by piezoelectrical pulsing, but very small nozzles are still required. However this necessity for such fine nozzles has led to considerable practical problems in the past, in that they become totally or partially blocked very readily when any solid particles are present in the ink or when evaporation of the ink leads to encrustation at the tip. Inks formulated for such printers are desirably free from pigments; leading in turn to difficulties in achieving satisfactory optical density. This is a long recognized problem which has led to such proposals as the Hertz compound jet, originally proposed about ten years ago and described in U.S. Pat. No. 4,196,437; but the problems of nozzle clogging can still arise in modern commercial ink jet printers. Similar problems can also be caused by recycled ink, which requires careful filtering to remove solid pollutants picked up during each cycle (there being typically 40–50 cycles in printers recycling up to 98% of the drops ejected), the solids being picked up externally from the environment, or internally through precipitation due to solvent evaporation or pH changes or microbiological growth, or they may be deposited in the nozzles through drying out or chemical reaction during inactive periods, for example.

The procedures for drop-on-demand printers are very different in that the production of ink drops is intermittent, these only being produced when the print head is aligned with an appropriate part of the receptor surface, drop production being under the control of the information-carrying signals. Drops may be drawn from a row of nozzles when printing a whole width of page simultaneously, and although they do not have the dirt collecting problems of the recycled inks of the continuous jet printers, they are more prone to blocking of infrequently used nozzles through evaporation of the static exposed ink surface. IEEE Transactions on Industry Applications, Vol 1A-21, No 1, January/February 1985 describes how drops may be produced on demand from selected positions along a slot, instead of from individual nozzles, by providing a multiplicity of electrodes along the inside of the slot, one at each point from which release of a drop may be required. This slotted printing head is said to suffer less from clogging.

SUMMARY OF THE INVENTION

We have found that in multi-jet printers of the continuous ink jet kind also, the occurrences of clogging could be reduced by avoiding using the very fine nozzles customarily employed in such printers. However, to put this into practice we had first to devise and develop an alternative way of producing continuously an array of evenly spaced parallel ink jets, without those individual nozzles to define their positions, shapes and thicknesses.

Accordingly, one aspect of the present invention provides an ink jet printer having a print head for emitting a plurality of continuous ink jets each comprising a stream of moving charged ink drops, and means for deflecting selected drops or groups of drops from each stream in response to information-carrying signals whereby a receptor surface can be placed to receive the deflected or undeflected drops to provide a record of that information, characterised in that the print head comprises (i) an elongated slot or an elongated edge portion, (ii) a feeder for continuously supplying ink to the slot or edge portion uniformly along its length, and (iii) means to subject the ink as it flows through the slot or over the edge portion, to an electrostatic field sufficient to draw off the ink continuously as an array of parallel cusps extending away from the slot or edge portion thereby to provide one of the said continuous ink jets from each cusp.

The edge portion needs to be sufficiently sharp to provide a sufficiently strong field to draw out the cusps, but too sharp an edge may lead to arcing. The optimum sharpness depends on the ink and on the field strength required. However, an edge of radius 50–150 μm generally provides a suitable compromise.

A further aspect of the invention provides a method of ink jet printing in which ink is caused to be emitted from a print head as a plurality of continuous ink jets each comprising a stream of moving ink drops, and selected drops or groups of drops from each stream are deflected in response to information-carrying signals applied to deflecting means associated with the print head such that either the deflected or the undeflected drops are directed onto a receptor surface to provide a record of that information, characterised in that the method comprises supplying the ink to a print head comprising an elongated slot or an elongated edge portion, such supply of ink being continuous and uniform along the length of the slot or edge portion, and simultaneously applying an electrostatic field at the slot or edge portion sufficient to draw the ink away from the head as a uniform array of parallel cusps each of which breaks up to form one of the continuous ink jets of moving ink drops.

The inks used are preferably high resistivity inks. Resistivities in the range $10^7$ to $10^{10}$ ohm cm are preferred. Approaching the limits in either direction gives less effective drop formation. Lower resistivity inks give smaller drops and the jets become increasingly unstable, with discharge from the ends of the ligaments in still lower resistivity media. Resistivities approaching $10^{10}$ ohm cm generally lead to larger drops being formed, and print resolution may suffer. We particularly prefer to use inks having resistivities within the range $10^8$ to $10^9$ ohm cm.

The ink jets of the present invention flow continuously and, as in other continuous flow multi-jet printers, the deflecting means may comprise a plurality of units each of which controls the drops of an individual jet or group of jets. These units may be formed separately and subsequently assembled, or they may be formed as part of an integral device, e.g. printed circuit device, provided they can be separately operated in response to signals applied to them. To achieve optimum resolution in the printing, it is desirable for each unit to control the drops of a single individual jet, but in the present invention, without individual permanent nozzles to position the jets in alignment with the deflection units, the cusps can form anywhere along a uniform slot or edge portion. However the frequency of the cusps along the slot or edge portion is a function of the field strength and of the ink formulation, an increase in the applied voltage decreasing the spacing between the cusps. Increasing flow rate may also increase cusp spacing. By adjusting these variables the apparatus can be tuned to provide a suitable spacing between the jets, and thereby enable the jets to be aligned with the individual deflecting units. Failure to effect such tuning accurately will result in loss of resolution similar in appearance to an out-of-focus photograph.

A preferred method according to the invention is therefore one which includes using as deflecting means an array of individually activatable deflecting units uniformly spaced apart by a predetermined distance, adjusting the strength of the electrostatic field and the ink supply rate to provide an array of ink jets having substantially the same predetermined spacing as the deflecting units, and aligning the array of ink jets with the array of deflecting units. To some extent at least, alignment may be achieved automatically as the finite length of the slot or edge portion determines the position of each cusp in an array containing any specific number of cusps. However it may also be helpful at times to have means for moving the deflecting means and print head relative to each other in a direction parallel to the slot or edge portion, to enable fine adjustment of the alignment of the jets with the deflecting units to be carried out.

We generally prefer that the slot or edge portion be straight. With such a printer a flat receptor sheet can be traversed by the print head and each jet be enabled to travel through a trajectory similar and parallel to those of jets produced at other positions along the print head. However for certain applications, e.g. where the receptor is a cylindrical surface of a container, other configurations of print head and deflecting means may be more appropriate, but for any such application arcuate shapes subtended by a common axis are preferred for the print head and deflection means, to enable them to be moved relative to each other for fine adjustment of the jet and deflector unit alignment.

For optimum resolution it is also desirable to operate each deflection unit in respect of each drop of the jet which it controls, i.e. either to allow the drop to pass undeflected or to deflect it by a precise amount, and in most such cases to achieve such optimum resolution it is also necessary to apply the deflection field at a precise point in the drop's trajectory. Failure to achieve such precision may result in some drops being deflected a little too much or a little too short, giving a blurring of the image, but the degree of blurring which becomes objectionable is dependent on the application in which it occurs. Accordingly we prefer to synchronize the breaking up of the ends of the cusps to form drops by inducing such break up through application of some form of impulse to the cusps. Having thus predetermined when each drop shall be formed each information-carrying signal can be applied when each drop is in its most appropriate position.

A particularly preferred printer is one in which the means for providing the electrostatic field is effective to provide a primary field sufficient to form the array of parallel cusps, and additionally to superimpose thereon a secondary reinforcing field whose strength varies cyclically at a desired drop production frequency. Synchronization was found to occur over a surprisingly wide range of frequencies, but the limits of such frequency range do appear to depend on all the factors determining the natural drop production rate in the absence of such varying field, and on the strength of the varying field.

We prefer that the cyclic variation in the secondary field strength be a function having a transient rising edge, rather than a simple sinusoidal function. The abruptness of the transient rising edge provides a sharper impulse on the end of the cusp, and its short rise time defines more precisely when the drop breaks away. A square wave function has proved to be particularly effective.

The electrostatic field can be provided in known manner by creating an electrical potential difference between spaced electrodes. We prefer the elongated slot to be bounded by an electrically conductive material or the edge portion to be formed from an electrically conductive material to provide one of the electrodes. The remainder of the head preferably has an outer surface of insulating material. An alternative is to form all the outer surface of the head from an insulating material, and to immerse an electrode in the ink awaiting to pass through the slot. We prefer the other electrode to be positioned to lie on the far side of the receptor surface, i.e. on the side remote from the slot or edge portion, during use of the printer. This maintains the electrostatic attraction on the drops right up to the receptor surface, although a slotted electrode positioned between the head and the receptor, may provide an alternative in circumstances where our preferred remote electrode is unsuitable, e.g. where the receptor is a three-dimensional object.

The reasons for the reduced clogging tendencies appear to be two-fold. In the first place the slot provides a greater dimension in one direction, which allows through elongated particles too long to pass through a corresponding diameter round nozzle, and also reduces any bridging tendencies. It also has a particular advantage over any drop-on-demand system employing a row of nozzles or a slot, in that the ink is flowing continuously throughout the whole length of the slot or over the whole length of the edge portion, and hence any flow variations due to chemical or evaporatory deposition should be the same throughout its length. Also because of the continuity of flow there is less chance of sedimentory or evaporatory deposition. This can be particularly important where the print head is required to span the whole width of a receptor sheet moved across it in a direction orthogonal to the slot or edge portion, and where some areas, e.g. down the right hand edge, are used less frequently than others, as the continuous flow of the ink avoids the drop-on-demand printer's problem of leaving a static meniscus to evaporate and deposit a clogging skin.

As with conventional continuous ink jet printers using individual nozzles, either the deflected or the undeflected drops can be used for printing the receptor surface according to the printer's design and construction, and an appropriate information-carrying signal supplied to the deflectors.

BRIEF DESCRIPTION OF THE DRAWINGS

The invention is illustrate by two embodiments described below with reference to the accompanying drawings, in which.

DETAILED DESCRIPTION OF THE PRESENTLY PREFERRED EMBODIMENT

Figure 1:
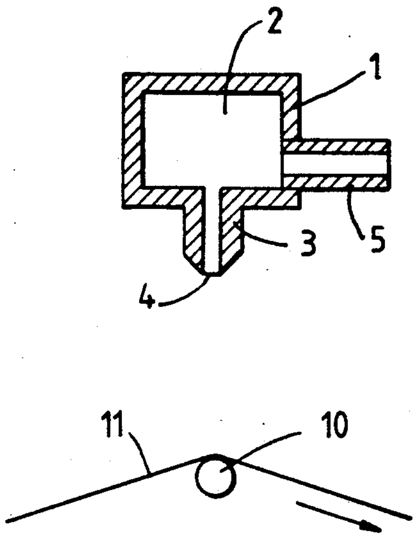
FIG. 1 is a transverse section through a print head having a slot through which ink can be continuously extruded.
Figure 2:
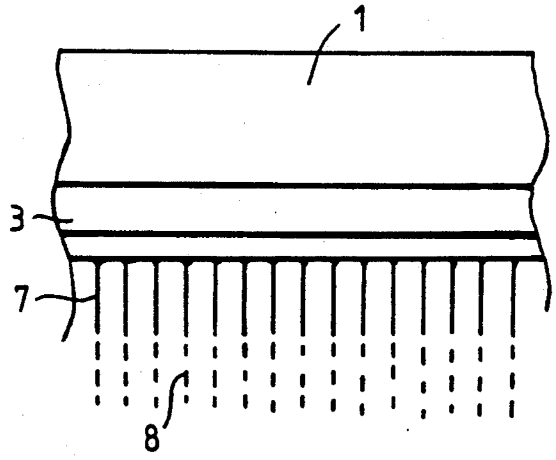
FIG. 2 is a longitudinal section through part of the head of FIG. 1, showing the ink gathered into cusps.

The head shown in FIGS. 1 and 2 comprises an elongated electrically insulated body 1 which is hollow to provide a plenum chamber 2. Extending from the base of the body are two parallel ribs 3 spaced apart to provide a narrow slot 4 which is of constant width throughout the length of the body, suitably about 100 μm internal width although narrower slots can also be used, and which communicates with the plenum chamber. The slot is lined with electrically conducting material which is connected to a source of high electrical potential, e.g. 10–20 kV, to act as one of the electrodes providing the primary field. Leading to the plenum chamber is a feeder tube 5 through which ink may be supplied to the chamber. This can be duplicated along the length of the chamber to assist in keeping the ink flow uniform.

FIG. 2 shows the head in use, with ink being supplied uniformly to the whole length of the slot and a strong electrostatic field applied in the direction of the ink flow. This forms the ink into an array of parallel spikey cusps 7 as soon as it emerges from the slot, and within a short distance of travel from the slot each cusp can be seen to break up into a series of drops 8. What is particularly noticeable is the regularity and uniformity of the cusps as each becomes a continuous jet of ink drops. For fine printing we use a strong field to bring the cusps close together and a large number of cusps are formed, the portion shown in FIG. 2 being only a small intermediate portion of the print head (which extends the whole width of a page of receptor medium) enlarged to illustrate the cusp array. Typically the slots we have used so far for producing such rows of continuous jets have had their smallest dimension similar to the diameter of the fine nozzles generally used in conventional printers, and we have not experienced the clogging characteristics of such nozzles.

The cusps are formed by the strong applied field. This can be provided by placing a target electrode behind the receptor surface, and applying a potential difference between the electrode and the print head i.e. in a manner substantially similar to that used previously by C R Winston for attracting droplets from a single nozzle, as described in U.S. Pat. No. 3,060,429. In the present embodiment, however, the electrode needs to be an elongated conductor lying parallel to the slot, and by moving the receptor surface in front of the electrode in a direction orthogonal to the plane of the slot and target electrode, information may be written onto the receptor a full line at a time. These are shown schematically in FIG. 1, the target electrode being shown as a cylindrical rod 10 (shown in section), with a web of paper 11 providing the receptor surface and moving in the direction of the arrow. Other configurations of electrodes, can also be used to create or modify the field. Particularly useful is an electrode having two elongated portions positioned one on each side of the slot or edge portion and lying parallel to it. Most suitably this is placed close to the slot or edge portion, but can be placed further down the flight path, care being taken to avoid it becoming a target for the ink drops. Other variations can also be introduced within the scope of this invention.

Figure 3:
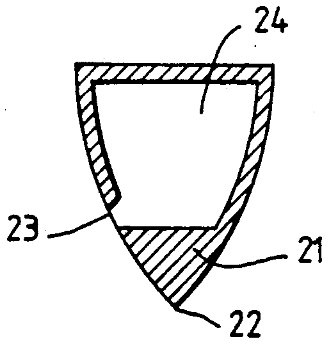
FIG. 3 is a transverse section through a different print head having a sharp edge from which to form the jets.
Figure 4:
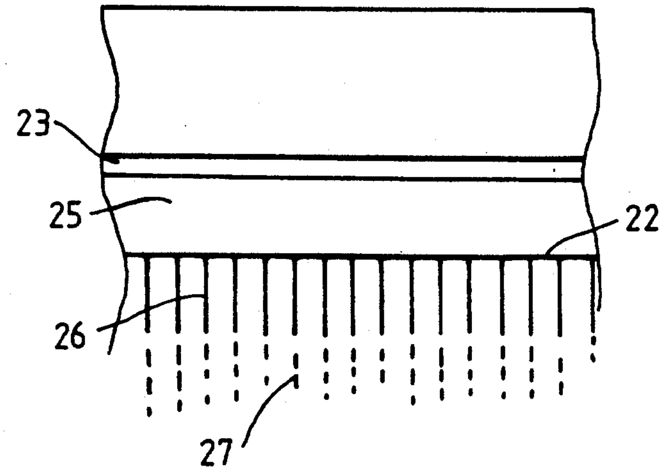
FIG. 4 is a longitudinal section through part of the head shown in FIG. 3.

As the jets are formed along the slot, they appear to be coming from the center of the slot, that is from between the two adjacent but spaced apart hard edges. However, this can be a potential source of irregularities if the jets become drawn from either of the hard edges or anywhere between, in a variable manner. To avoid such positional uncertainty, even though the width of the slot is only small, we prefer to form our cusps along a single sharp edge, and an embodiment designed to operate in such manner is shown in FIGS. 3 and 4, the views corresponding to those of FIGS. 1 and 2.

In the second embodiment, a hollow body 21 extends to a single fairly sharp, elongated edge portion 22, the radiused surface of which is formed from a conducting material and is connected to a source of high electrical potential to form one of the electrodes providing the primary electrostatic field. A typical edge portion radius is about 100 μm depending on the other design and operating parameters. Above the edge portion is a slot 23 of similar length and running parallel to the edge portion. The slot leads from a plenum chamber 24 within the body, from which ink can be supplied as shown in FIG. 4. Thus the ink runs out of the slot, then over the outer surface of the body as a supported uniform film 25 until it reaches the edge portion. It then continues, leaving that conducting surface under the influence of the strong electrostatic field, which forms it, as above, into a row of sharp cusps 26, from the tips of which are broken streams of individual charged drops 27. A particular advantage of this configuration is that the dimensions of the slot can be made sufficiently large to allow the use of inks comprising dispersions of fine particulate solids without undue risk of blockage. The spacing of the cusps can be tuned by balancing the voltage applied between the electrode and the edge portion, and the rate of supply of ink, as described above for the previous embodiment.

In both embodiments, the supply of ink drops reaching the receptor sheet, i.e. the drops that print the information, can be controlled using electrostatic deflection, the stream of drops forming each jet being deflected either into or away from a collecting means (for recirculation) in a known manner. Other means of deflection, such as the moveable catcher tubes referred to above, may also be applicable to either of these embodiments, although the use of such tubes would be limited by mechanical considerations.

To evaluate synchronization of drops an electrically conducting nozzle was suspended 1 cm above a target electrode. No receptor surface was interposed, the ink merely being allowed to run to waste. An electrical potential difference of 13 kV was provided across the target electrode and nozzle, and ink caused to flow from the latter under the influence of the electrostatic field produced by the applied potential. The ink appeared to break up into drops as it fell, but no specific position could be seen by eye at which the ligaments of ink broke up into drops. The falling liquid was then illuminated by a stroboscope variable up to a flash rate of about 2.5 kHz, but no more detail could be seen anywhere within its flash rate range.

A 2 kV reinforcing square wave secondary voltage of 2 kHz frequency was then superimposed on the constant 13 kV, giving cyclical variation from 13 to 15 kV. The stroboscope flashing rate was again varied until the ink drop motion was stopped by the flashes at a flash rate of 2 kHz. Variations of the overall constant voltage and that of the superimposed square wave were found to vary the ligament spacing and the drop rate.

With the secondary voltage again set at 2 kV in the form of a 2 kHz square wave, two deflector plates were placed on either side of the falling drops and a square wave potential placed across them. When this was similarly tuned to 2 kHz a consistent deflection of the drops was obtained, and this could be tuned to give optimum deflection by adjusting the phase angle between the secondary potential across the main electrodes and the deflecting potential across the plates.

We claim:

1. An ink jet printer having a print head for emitting a plurality of continuous ink jets each comprising a stream of moving charged ink drops, comprising:

means for deflecting or not deflecting selected drops or groups of drops from each stream in response to information-carrying signals whereby a receptor surface can be placed to receive the deflected or undeflected drops to provide a record of that information;

a print head elongated slot or an elongated edge portion;

a feeder for continuously supplying ink to the slot or edge portion uniformly along its length; and means to subject the ink as it flows through the slot or over the edge portion to an electrostatic field sufficient to draw off the ink continuously as an array of parallel cusps extending away from the slot or edge portion thereby to provide one of said continuous ink jets from each cusp.

2. An ink jet printer as claimed in claim 1 in which the deflecting means comprises an array of individually activatable deflecting units uniformly spaced apart, and positioned to enable the various jets or groups of jets produced along the length of the slot or edge portion to be deflected each by a different deflecting unit.

3. An ink jet printer as claimed in claim 2 having means for moving the deflecting means and the print head relative to each other in a direction parallel to the slot or edge portion sufficient to enable fine adjustment of the alignment of the ink jets with the deflecting units to be carried out.

4. An ink jet printer as claimed in claim 3 having means to synchronize the breaking up of the ends of the cusps to form drops.

5. An ink jet printer as claimed in claim 4 in which the means for providing the electrostatic field is effective to provide a primary field sufficient to form the array of parallel cusps, and additionally to superimpose thereon a secondary reinforcing field whose strength varies cyclically at a drop production frequency.

6. An ink jet printer as claimed in claim 5 in which the cyclic variation in the secondary field strength is a function having a transient leading edge.

7. An ink jet printer as claimed in claim 6 in which the cyclic variation in the secondary field strength is a square wave function.

8. An ink jet printer as claimed in claim 7 in which the means for providing the electrostatic field comprises spaced electrodes and means for creating an electrical potential difference between them, the elongated slot being bounded by an electrically conductive material or the edge portion being formed from an electrically conductive material respectively, to provide one of the said electrodes.

9. An ink jet printer as claimed in claim 8 in which the other electrode is positioned to lie on the side of the receptor remote from the slot or edge portion.

10. A method of ink jet printing in which ink is caused to be emitted from a print head as a plurality of continuous ink jets, each comprising a stream of moving ink drops, comprising the steps of:

selected drops or groups of drops from each stream deflecting in response to information-carrying signals applied to deflecting or not deflecting means associated with the print head such that either the deflected or the undeflected drops are directed onto a receptor surface to provide a record of that information;

supplying the ink to a print head comprising an elongated slot or an elongated edge portion, such supply of ink being continuous and uniform along the length of the slot or edge portion; and simultaneously with said supplying step, applying an electrostatic field at the slot or edge portion sufficient to draw the ink away from the head as a uniform array of parallel cusps each of which breaks up to form one the continuous ink jets of moving ink drops.

11. A method as claimed in claim 10 which includes the steps of:

disposing as deflecting means an array of individually activatable deflecting units uniformly spaced apart by a predetermined distance;

adjusting the strength of the electrostatic field and the ink supply rate to provide an array of ink jets having substantially the same predetermined spacing as the deflecting units; and aligning the array of ink jets with the array of deflecting units.

12. A method as claimed in claim 10 or claim 11 in which the resistivity of the ink lies within the range $10^7$–$10^{10}$ ohm cm.

* * * * *